(12) United States Patent
Ting et al.

(10) Patent No.: US 10,009,055 B2
(45) Date of Patent: Jun. 26, 2018

(54) ANTENNA ASSEMBLY AND COMMUNICATION DEVICE HAVINIG THE SAME

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventors: Shih-Fang Ting, New Taipei (TW); Zhi-Bin Guo, Shenzhen (CN); Xue-Gong Song, Shenzhen (CN)

(73) Assignees: HONG FU JIN PRECISION INDUSTRY (ShenZhen) CO., LTD, Shenzhen (CN); HON HAI PRECISION INDUSTRY CO., LTD., New Taipei (TW)

(*) Notice: Subject to any disclaimer, the term of this patent is extended or adjusted under 35 U.S.C. 154(b) by 6 days.

(21) Appl. No.: 15/343,439

(22) Filed: Nov. 4, 2016

(65) Prior Publication Data

US 2017/0187095 A1    Jun. 29, 2017

(30) Foreign Application Priority Data

Dec. 29, 2015    (CN) .......................... 2015 1 1001442

(51) Int. Cl.
| | |
|---|---|
| *H01Q 1/24* | (2006.01) |
| *H04B 1/3827* | (2015.01) |
| *H01Q 7/00* | (2006.01) |
| *H01Q 9/04* | (2006.01) |

(52) U.S. Cl.
CPC ........... *H04B 1/3827* (2013.01); *H01Q 1/243* (2013.01); *H01Q 7/00* (2013.01); *H01Q 9/0485* (2013.01)

(58) Field of Classification Search
CPC .. H01Q 1/24; H01Q 1/38; H01Q 7/00; H01Q 9/04; H04B 1/3827
USPC .......................... 343/702, 700 MS, 841, 873
See application file for complete search history.

(56) References Cited

U.S. PATENT DOCUMENTS

| | | | | |
|---|---|---|---|---|
| 2005/0099344 A1* | 5/2005 | Okubo | ................... | H01Q 1/243 343/702 |
| 2009/0051604 A1* | 2/2009 | Zhang | ................... | H01Q 1/243 343/702 |
| 2014/0159990 A1* | 6/2014 | Azhari | ................... | H01Q 1/088 343/878 |
| 2014/0266923 A1* | 9/2014 | Zhou | ........................ | H01Q 5/35 343/702 |
| 2014/0306857 A1* | 10/2014 | Bevelacqua | ........... | H01Q 1/243 343/750 |

* cited by examiner

*Primary Examiner* — Dameon E Levi
*Assistant Examiner* — Hasan Islam
(74) *Attorney, Agent, or Firm* — ScienBiziP, P.C.

(57) ABSTRACT

An antenna assembly includes a looped but open metallic antenna and a flat ceramic antenna within the loop of the metallic antenna. The metallic antenna includes a first end portion and a second end portion at two ends. The ceramic antenna is surrounded by the metallic antenna. The first end portion is connected to the ceramic antenna and the second end is a free end, and the output power of wireless signals thusly radiated is increased at given frequencies.

6 Claims, 6 Drawing Sheets

ANTENNA ASSEMBLY AND COMMUNICATION DEVICE HAVINIG THE SAME

FIELD

The subject matter herein generally relates to an antenna assembly and a communication device having the antenna assembly.

BACKGROUND

Antennas are widely used in communication devices, such as mobile phones and remote controllers, to radiate wireless signals. However, a communication device usually comprises a metallic casing for housing the antenna which may seriously degrade the radiation efficiency of the antenna and further limit an effective radiation distance of the antenna. Therefore, there is room for improvement within the art.

BRIEF DESCRIPTION OF THE DRAWINGS

Implementations of the present technology will now be described, by way of example only, with reference to the attached figures.

DETAILED DESCRIPTION

Figure 1:
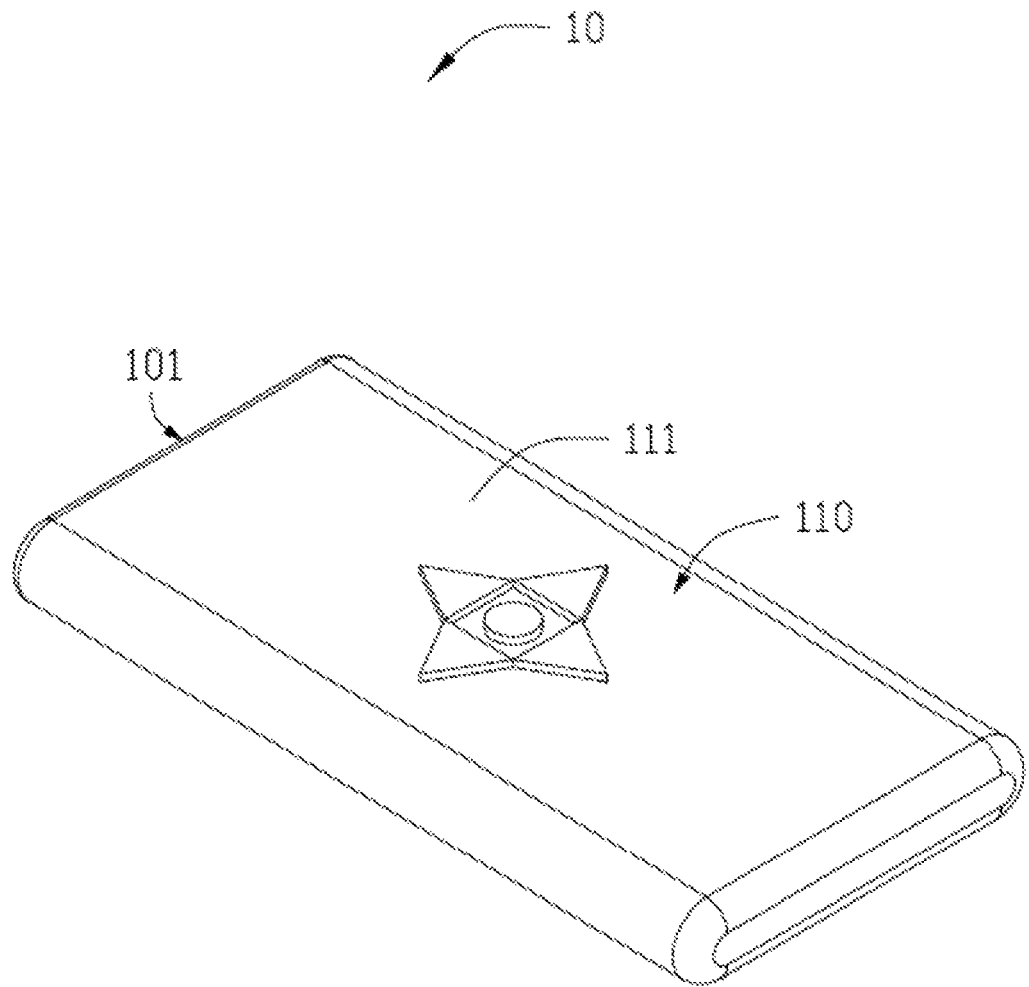
FIG. 1 is an isometric view of a first exemplary embodiment of a communication device.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein can be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain sections have been exaggerated to better illustrate details and features of the present disclosure.

Several definitions that apply throughout this disclosure will now be presented.

The term "substantially" is defined to be essentially conforming to the dimension, shape, or other feature that the term modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

FIG. 1 illustrates a first exemplary embodiment of a communication device 10. The communication device 10 may be a remote controller having wireless communication functionality. The remote controller may be used to control a to-be-controlled device (not shown), such as a projector, a television, a set-top box, or a game machine, to perform actions.

Figure 2:
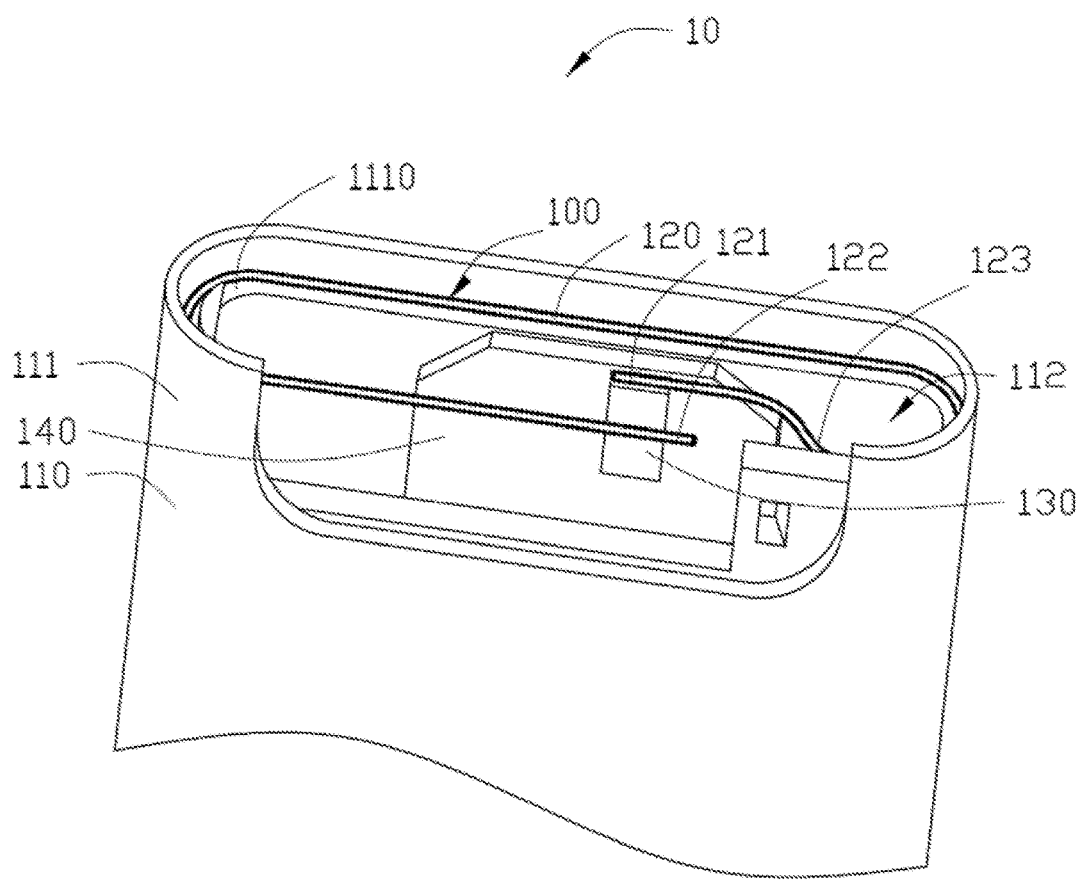
FIG. 2 is an isometric view of an antenna assembly of the communication device of FIG. 1.

Also referring to FIG. 2, the communication device 10 comprises an antenna assembly 100, a metallic casing 110, and a front cover 101. The metallic casing 110 is hollow, and comprises a front end portion 111 facing the to-be-controlled device when the communication device 10 is in use. The front cover 101 covers the front portion 111, thereby defining a receiving space 112 to receive the antenna assembly 100.

The antenna assembly 100 comprises a metallic antenna 120 and a ceramic antenna 130. The metallic antenna 120 and the ceramic antenna 130 are positioned adjacent to and facing the front cover 101. Thus, the wireless signals from the metallic antenna 120 can directly radiate out from the front portion 111.

The metallic antenna 120 is curved and has two ends, one end comprises a first end portion 121 and another end comprises a second end portion 122. The metallic antenna 120 further comprises a turning point 123 positioned between the first end portion 121 and the second end portion 122. A portion of the metallic antenna 120 positioned between the second end portion 122 and the turning point 123 is attached to an inner periphery of the front portion 111. The remaining portion of the metallic antenna 120 positioned between the first end portion 121 and the turning point 123 protrudes from the inner periphery of the front portion 111 into the receiving space 112. The metallic antenna 120 may be made of copper or silver.

The ceramic antenna 130 may be substantially flat. The ceramic antenna 130 is surrounded by the metallic antenna 120. The first end portion 121 is connected to the ceramic antenna 130. The second end portion 122 is a free end. In at least one exemplary embodiment, the ceramic antenna 130 is connected to the first end portion 121 by soldering for example.

In at least one exemplary embodiment, an annular flange 1110 protrudes from the inner periphery of the front portion 111. The metallic antenna 120 is supported by the annular flange 1110. Thus, if a portion of the wireless signals radiates away from the front portion 111, the portion of the wireless signals may be reflected by the annular flange 1110 towards the front portion 111. Thus, attenuation of the wireless signals can be reduced.

In at least one exemplary embodiment, the metallic antenna 120 is electrically insulated from the metallic casing 110. An anodizing treatment can be applied to the metallic casing 110 to form an oxidation film (not shown) which electrically insolates the metallic casing 110 from the metallic antenna 120.

In at least one exemplary embodiment, the metallic casing 110 comprises a supporting structure 140. The ceramic antenna 130 is supported and fixed by the supporting structure 140. The supporting structure 140 may be a printed circuit board.

Figure 3:
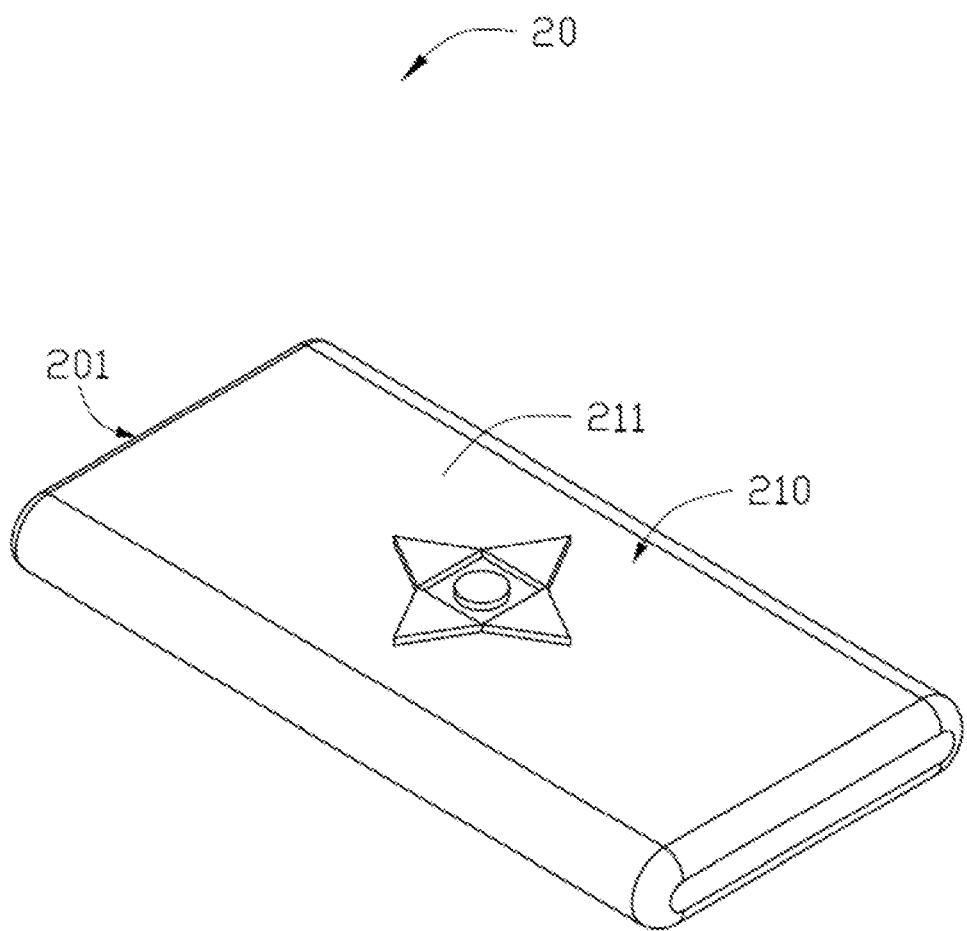
FIG. 3 is similar to FIG. 1, but showing a second exemplary embodiment of an antenna assembly.
Figure 4:
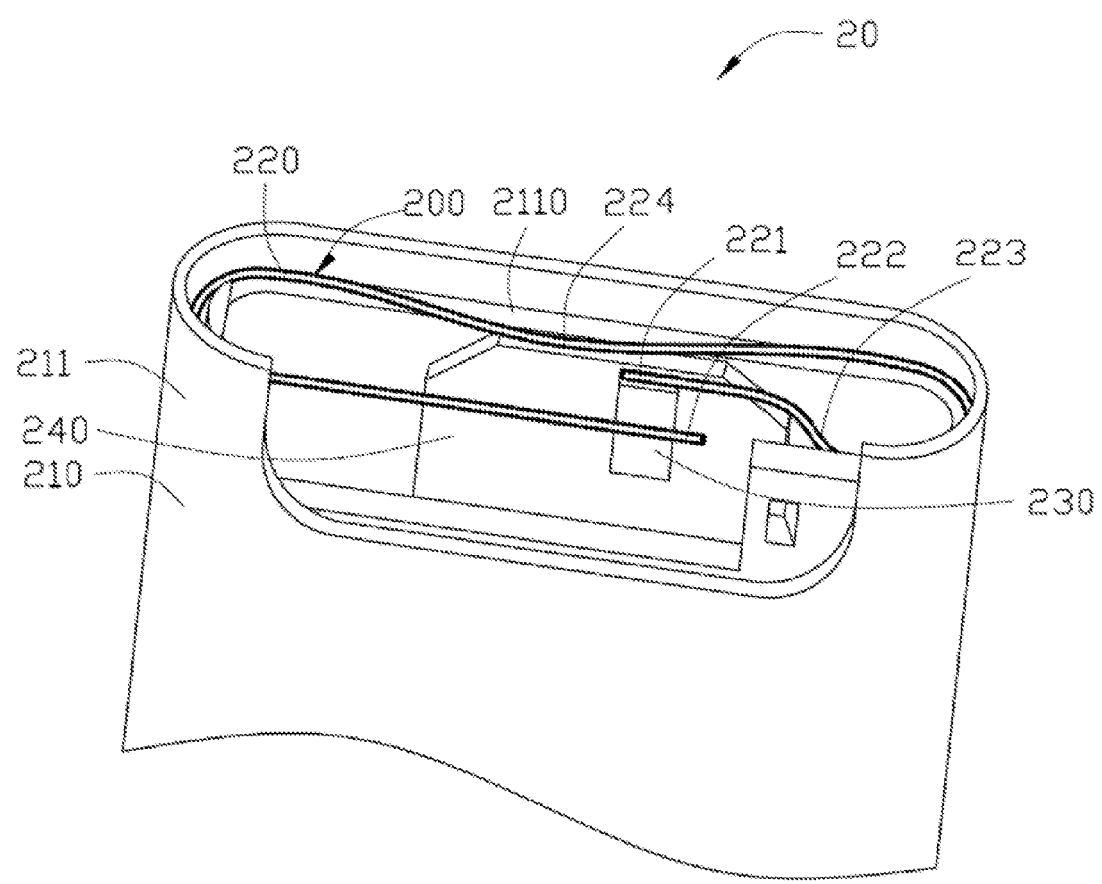
FIG. 4 is an isometric view of an antenna assembly of the communication device of FIG. 2.

FIGS. 3 and 4 illustrates a second exemplary embodiment of an antenna assembly 200. The communication device 20 comprises an antenna assembly 200, a metallic casing 210, and a front cover 201. The metallic casing 210 is hollow, and comprises a front end portion 211 facing the to-be-controlled device when the communication device 20 is in use. The front cover 201 covers the front portion 211, thereby defining a receiving space 212 to receive the antenna assembly 200.

The antenna assembly 200 comprises a metallic antenna 220 and a ceramic antenna 230. The metallic antenna 220 and the ceramic antenna 230 are positioned adjacent to and facing the front cover 201. Thus, the wireless signals from the metallic antenna 220 can directly radiate out from the front portion 211.

The metallic antenna 220 is curved and has two ends, one end comprises a first end portion 221 and another end comprises a second end portion 222. The metallic antenna 220 further comprises a turning point 223 positioned between the first end portion 221 and the second end portion 222. A portion of the metallic antenna 220 positioned between the second end portion 222 and the turning point 223 is attached to an inner periphery of the front portion 211. The remaining portion of the metallic antenna 220 positioned between the first end portion 221 and the turning point 223 protrudes from the inner periphery of the front portion 211 into the receiving space 212.

The metallic antenna 220 is an enamel wire which comprises a metallic wire and an insulated layer wrapped around the metallic wire. In this exemplary embodiment, at least one bent portion 224 is formed between the second end portion 222 and the turning point 223, thereby changing a radiation field of the antenna assembly 200, and preventing the insulated layer from affecting the wireless signals from the metallic antenna 220.

The ceramic antenna 230 may be substantially flat. The ceramic antenna 230 is surrounded by the metallic antenna 220. The first end portion 221 is connected to the ceramic antenna 230. The second end portion 222 is a free end. In at least one exemplary embodiment, the ceramic antenna 230 is connected to the first end portion 221 by soldering for example.

In at least one exemplary embodiment, an annular flange 2110 protrudes from the inner periphery of the front portion 211. The metallic antenna 220 is supported by the annular flange 2110. Thus, if a portion of the wireless signals radiates away from the front portion 211, the portion of the wireless signals may be reflected by the annular flange 2110 towards the front portion 211. Thus, attenuation of the wireless signals can be reduced.

In at least one exemplary embodiment, the metallic antenna 220 is electrically insulated from the metallic casing 210. An anodizing treatment can be applied to the metallic casing 210 to form an oxidation film (not shown) which electrically insolates the metallic casing 210 from the metallic antenna 220.

In at least one exemplary embodiment, the metallic casing 210 comprises a supporting structure 240. The ceramic antenna 230 is supported and fixed by the supporting structure 240. The supporting structure 240 may be a printed circuit board.

Figure 5:
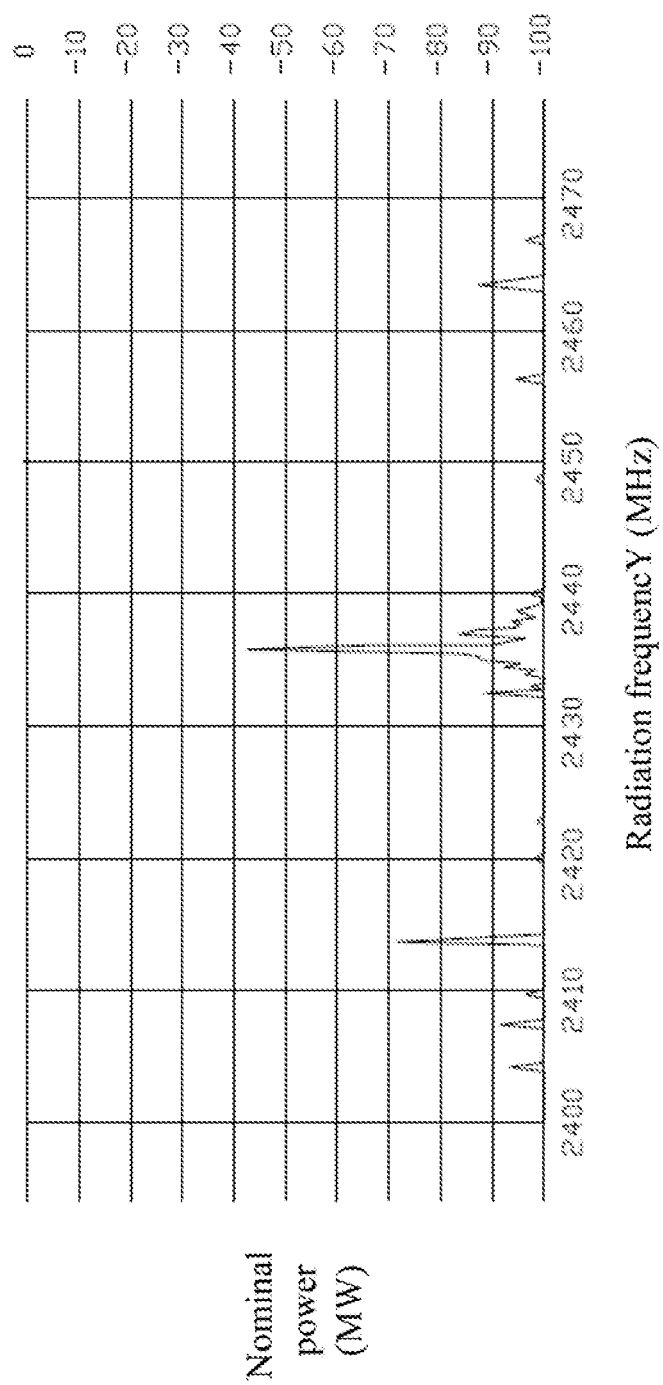
FIG. 5 is a diagram showing a relationship between radiating frequencies and radiating output powers of a previous communication device which only comprises a ceramic antenna.
Figure 6:
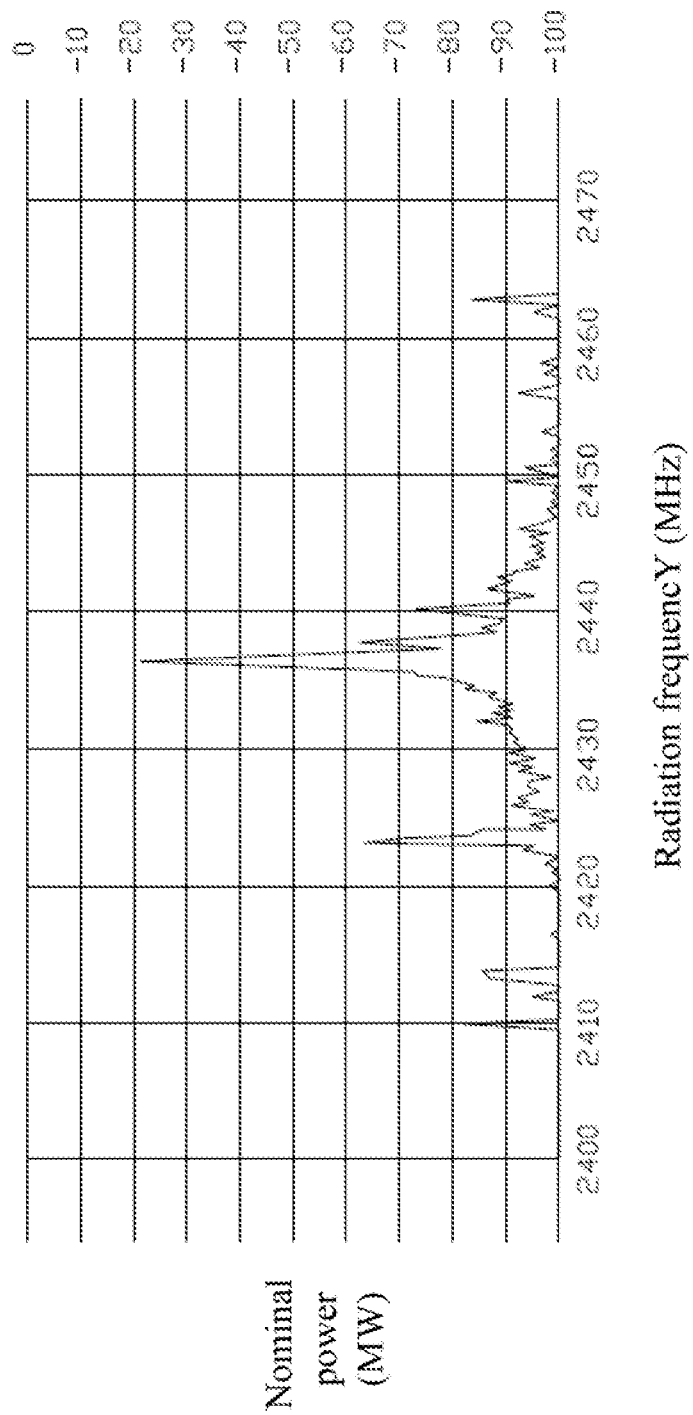
FIG. 6 is a diagram showing a relationship between radiating frequencies and radiating output powers of the communication device of FIG. 1 or FIG. 3.

A relationship between radiating frequencies and radiating output powers of a communication device comprising only a ceramic antenna is illustrated in FIG. 5. A comparison of the communication devices 10 and 20 is also illustrated in FIG. 6. FIGS. 5 and 6 show the test results, which illustrate that the communication devices 10 and 20 have higher radiating output powers than the previous communication devices.

The exemplary embodiments shown and described above are only examples. Many details are often found in the art such as the other features of a wireless communication device. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the sections within the principles of the present disclosure, up to and including the full extent established by the broad general meaning of the terms used in the claims. It will therefore be appreciated that the exemplary embodiments described above may be modified within the scope of the claims.

What is claimed is:

1. A communication device comprising:
a metallic casing defining a receiving space;
an antenna assembly received in the receiving space, the antenna comprising:
a metallic antenna being curved and having two ends, the metallic antenna comprising a first end portion at one end and a second end portion at another end; and
a ceramic antenna surrounded by the metallic antenna, the first end portion connected to the ceramic antenna, the second end being a free end;
wherein the metallic antenna further comprises a turning point positioned between the first end portion and the second end portion; a portion of the metallic antenna positioned between the second end portion and the turning point is attached to an inner periphery of the metallic casing; a remaining portion of the metallic antenna positioned between the first end portion and the turning point protrudes from the inner periphery of the metallic casing into the receiving space.

2. The communication device of claim 1, wherein the metallic antenna is an enamel wire.

3. The communication device of claim 2, wherein at least one portion is a bent portion, and the bent portion is formed between the second end portion and the turning point.

4. The communication device of claim 1, wherein the first end portion is connected to the ceramic antenna by soldering.

5. The communication device of claim 1, wherein an annular flange protrudes from the inner periphery of the metallic casing to support the metallic antenna.

6. The communication device of claim 1, wherein the metallic casing comprises a supporting structure to support and fix the ceramic antenna.

* * * * *